(No Model.) 2 Sheets—Sheet 1.
J. H. STEVENS, Jr.
WATER CLOSET.
No. 519,878. Patented May 15, 1894.
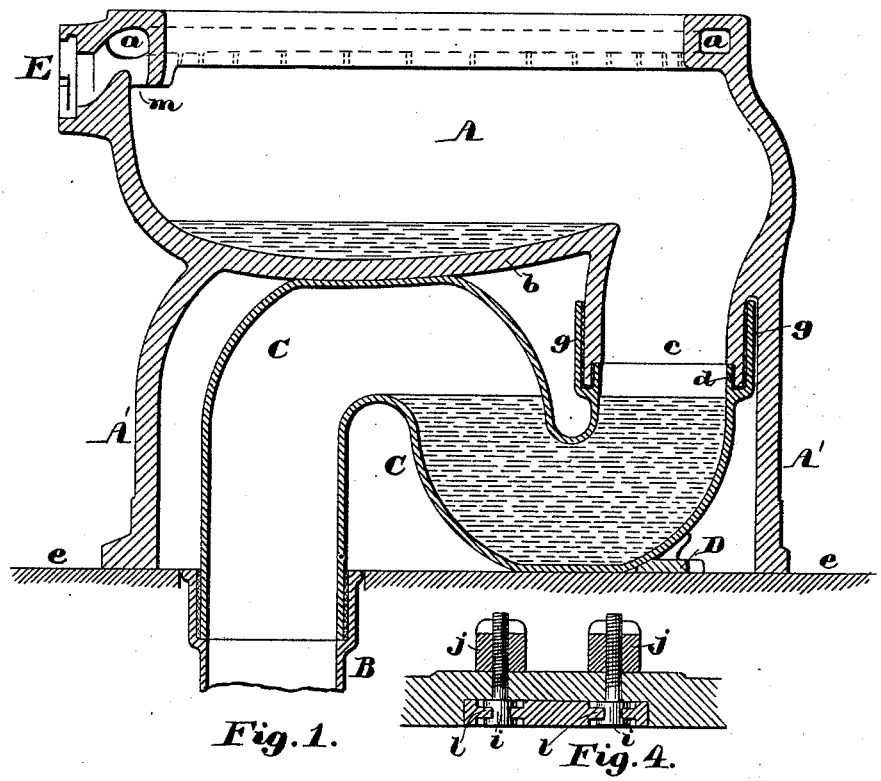
Fig. 1. Fig. 4.
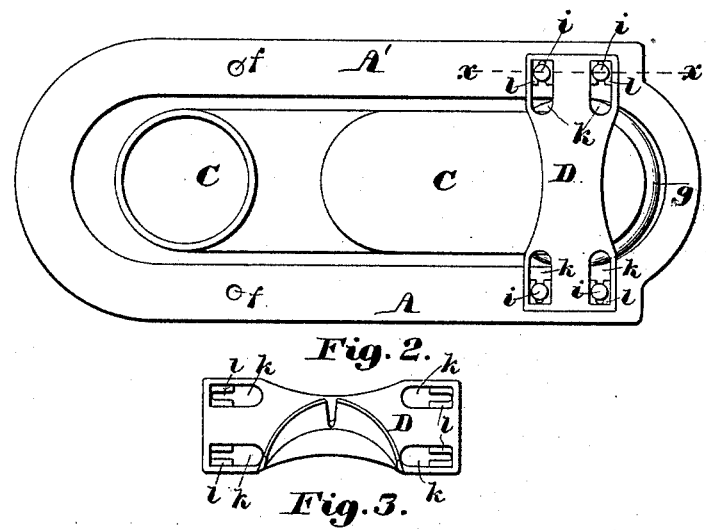
Fig. 2.
Fig. 3.
Witnesses:
Walter E. Lombard
Geo. E. Mitchell
Inventor:
John H. Stevens, Jr.
by N. C. Lombard
Attorney.

(No Model.) 2 Sheets—Sheet 2.

J. H. STEVENS, Jr.
WATER CLOSET.

No. 519,878. Patented May 15, 1894.

Witnesses:
Walter E. Lombard.
Geo. E. Mitchell.

Inventor:
John H. Stevens, Jr.,
by N. C. Lombard
Attorney.

UNITED STATES PATENT OFFICE.

JOHN H. STEVENS, JR., OF CAMBRIDGE, MASSACHUSETTS.

WATER-CLOSET.

SPECIFICATION forming part of Letters Patent No. 519,878, dated May 15, 1894.

Application filed November 7, 1893. Serial No. 490,289. (No model.)

*To all whom it may concern:*

Be it known that I, JOHN H. STEVENS, Jr., of Cambridge, in the county of Middlesex and State of Massachusetts, have invented certain new and useful Improvements in Water-Closets, of which the following, taken in connection with the accompanying drawings, is a specification.

My invention relates to water closets and it consists in certain novel features of construction, arrangement and combination of parts which will be readily understood by reference to the description of the accompanying drawings and to the claims hereto appended and in which my invention is clearly pointed out.

Figure 5:
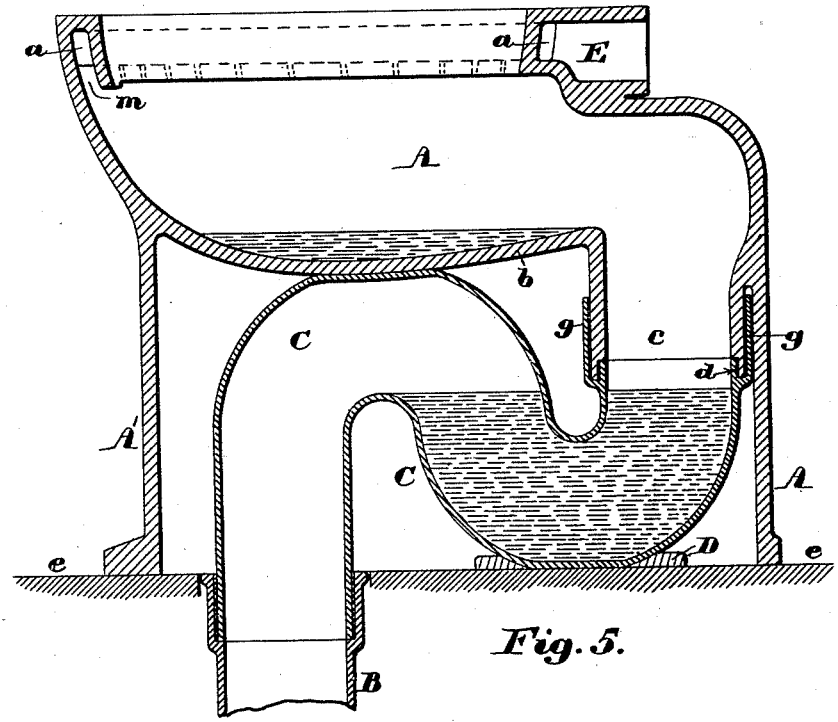
Figures 6, 7:
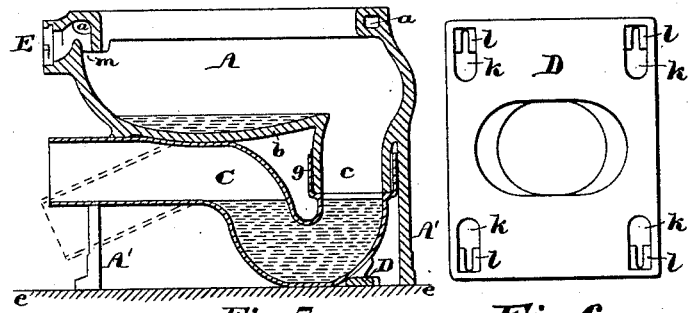

Figure 1 of the drawings is a central vertical section of a water closet bowl and trap having the trunk or discharge opening from the bowl at the front and embodying my invention. Fig. 2 is an inverted plan of the base of the bowl supporting pedestal and the trap. Fig. 3 is a plan of the trap supporting plate. Fig. 4 is a partial section on line $x, x$, on Fig. 2. Fig. 5 is a central vertical section illustrating the application of my invention to a water closet bowl having its trunk or discharge passage at the rear. Fig. 6 is a plan of modified form of the trap-supporting plate and Fig. 7 is a central vertical section of a water closet bowl and trap, drawn to a smaller scale, and illustrating the application of my invention in cases where the trap is to be connected to the waste pipe above the floor.

Water closet bowls have been made in one piece with the trap, all of earthenware, but it has been found that a metal trap is preferable, because a better joint can be made between a metal trap and the metal waste-pipe than between an earthenware trap and said metal waste-pipe, and hence many earthenware water-closet bowls are made without a trap but adapted to be secured to a metal trap which is exposed to view. This is objectionable from the fact that the metal trap soon becomes corroded and therefore unsightly when exposed to view. To obviate this objection the closet bowl has been formed with a pedestal constructed and arranged to inclose, and hide from view, the metal trap, in which case the trap is bolted to the bowl beneath the trunk or discharge passage, to accomplish which the pedestal has to be provided with a horizontal offset or projection some six inches more or less above the floor, so that the bolts for securing the flanged upper end of the trap to the bowl may pass to the outside of the pedestal where they will be accessible for applying or removing the binding nuts. This projection with the bolts and nuts on the exterior of the pedestal is objectionable, as forming an additional place to catch dirt, and renders it more difficult to keep the apparatus clean. This projection is particularly objectionable when applied to a bowl having its trunk or discharge passage at the front because the lower part of the pedestal will thereby be made to project too far forward from the center of the bowl. To remedy these several objections I construct the closet bowl and trap as shown in the accompanying drawings, in which—

A is the water closet bowl provided with a flushing rim $a$, a receiver $b$ and a discharge passage or trunk $c$ which may be at the front as shown in Figs. 1 and 7 or at the rear as shown in Fig. 5. The lower portion of the trunk $c$ is made in the form of a pendent pipe detached or removed from the wall of the pedestal A' and may have its lower portion rabbeted to enlarge its inner periphery as shown at $d$, in Figs. 1 and 5, or said rabbet may be omitted, as shown in Fig. 7 if desired. The pedestal A' and the trunk $c$ are formed in one piece with the bowl A, and the pedestal rests upon the floor $e$ and is secured thereto by lag screws, not shown, passing through the holes $f, f$, in the base flange of the pedestal shown in Fig. 2.

B is the metal waste pipe of ordinary construction in the upper end of which is set the lower or discharge end of the trap pipe C and secured therein so as to make a liquid tight joint by packing, soldering, calking or in any other well known manner. The upper end of said trap pipe C is preferably fitted into the rabbet $d$ as shown in Figs. 1 and 5 but may in some cases simply abut against the lower end of the pendent trunk pipe as shown in Fig. 7, and is provided with the expanded pipe section or sleeve $g$ connected thereto at its lower end and projecting upward outside of the pendent portion of the trunk c between said trunk and the wall of the pedestal A' as shown in Figs. 1, 5, and 7.

The joint between the metal trap C and the trunk c is packed with a water proof cement or red lead so as to form a liquid tight joint with the inner periphery of the trap pipe coinciding with the inner periphery of the trunk c as shown.

The bottom of the trap C is slightly flattened where it rests upon the floor in order to avoid cutting an opening in the floor, as is also the upper side of the upper bend where it bears against the receiver b in order to avoid increasing the height of the bowl or reducing the capacity of the trap pipe. The trap portion of the pipe C also rests upon the plate D which is secured to the bottom of the pedestal by the bolts i, i, and nuts j, j, the bottom of said pedestal being rabbeted to receive the ends of said plate so that the under surfaces of said plate and pedestal coincide as shown in Figs. 2 and 4.

The plate D has formed in each end thereof one or more slots k, the inner ends of which are of sufficient width for the free passage of the heads of the bolts i i while the outer portions of said slots are of considerably less width than the inner portions, the metal of said plate upon each side of said narrow portions of the slots k being rabbeted or reduced in thickness on both the upper and under sides to form thin lips l, l, to fit into slots or grooves cut in the sides of the heads of the bolts i, i, as shown in Figs. 2 and 4.

The plate D may be soldered to the trap pipe or be left disconnected therefrom as may be preferred.

The flushing water enters the flushing rim a at E and is discharged into the receiver through the small holes in the under side of said rim indicated by dotted lines in Figs. 1 and 5 and through the larger opening m at the rear side of the bowl when made in the form shown in Figs. 1 and 7 or at the front when made in the form shown in Fig. 5.

The plate D may be secured to the pedestal by bolts which are inserted through the holes in the flange of the pedestal from above and screw into tapped holes in said plate in a well known manner.

In Fig. 7 the trap pipe is represented in full lines, as projecting in a horizontal direction through the rear of the pedestal, and in dotted lines, as projecting in an inclined direction through the rear of said pedestal, the rear of said trap pipe being adapted to be connected to a waste pipe not shown above the floor of the room in a well known manner, the rear portion of the pedestal being slotted so that it can be placed in position over the trap pipe after said trap pipe has been placed in position and connected to the waste pipe.

What I claim as new, and desire to secure by Letters Patent of the United States, is—

1. In a water closet, the combination of a bowl or receiver; a pendent trunk or discharge passage and a bowl supporting pedestal formed integral with said bowl; a metal trap placed within said pedestal and having its upper end constructed to abut against and surround said pendent trunk a plate secured to the base of said pedestal and fitted to the under side of said trap to hold it in contact with said pendent trunk; and a water proof packing between said trap and pendent trunk.

2. In a water closet, the combination of a bowl or receiver; a pendent trunk or discharge pipe having the lower portion of its inner periphery rabbeted or enlarged, and a trap inclosing pedestal formed in one piece with said bowl and trunk; a metal trap having its upper end provided with a double wall the inner one to fit in the rabbet in said trunk and the other to surround and inclose said pendent trunk; a metal plate fitted to recesses in the base of said pedestal and fitted to the under side of said trap to hold it in contact with said pendent trunk; suitable bolts to secure said plate to said pedestal; and a water proof packing between said trap and pendent trunk.

3. In combination with a closet bowl or receiver a pendent trunk or discharge pipe and a trap inclosing pedestal all formed in one piece of earthenware, the metal trap C provided at its upper end with the expanded sleeve g to receive and inclose said pendent trunk; the supporting plate D provided with the slots k made of two different widths said plate being rabbeted on opposite sides of the narrower portions of said slots, on both the upper and lower sides of said plate forming lips l l; the bolts i i having heads of a thickness not greater than the thickness of said plate and grooved upon opposite sides to engage the lips l, l, of said plate; and suitable nuts to bind said bolts.

In testimony whereof I have signed my name to this specification, in the presence of two subscribing witnesses, on this 3d day of November, A. D. 1893.

JOHN H. STEVENS, Jr.

Witnesses:
N. C. LOMBARD,
WALTER E. LOMBARD.